(12) United States Patent
Nishide

(10) Patent No.: US 6,781,788 B2
(45) Date of Patent: Aug. 24, 2004

(54) VIDEO RECORDER HOUSING HAVING MAIN-AND-AUXILIARY PIVOTING GATE ASSEMBLY

(75) Inventor: Masahiko Nishide, Fukui (JP)

(73) Assignee: Orion Electric Co., Ltd. (JP)

( * ) Notice: Subject to any disclaimer, the term of this patent is extended or adjusted under 35 U.S.C. 154(b) by 0 days.

(21) Appl. No.: 10/103,085

(22) Filed: Mar. 21, 2002

(65) Prior Publication Data

US 2002/0135931 A1 Sep. 26, 2002

(30) Foreign Application Priority Data

Mar. 21, 2001 (JP) ........................................ 2001-080832

(51) Int. Cl.⁷ .............................................. G11B 5/008
(52) U.S. Cl. ...................................................... 360/85
(58) Field of Search ........................... 360/85, 83, 93, 360/96.5, 94, 90

(56) References Cited

U.S. PATENT DOCUMENTS 4,673,994 A * 6/1987 Hida ............................ 360/85
5,883,756 A * 3/1999 Suzuki ....................... 360/96.5

FOREIGN PATENT DOCUMENTS

| JP | 62140288 A | * | 6/1987 |
| JP | 06325469 A | * | 11/1994 |
| JP | 09-274790 | | 10/1997 |
| JP | 09288887 A | * | 11/1997 |
| JP | 10106247 A | * | 4/1998 |
| JP | 1019908 A | * | 7/1998 |

* cited by examiner

Primary Examiner—Tianjie Chen
(74) Attorney, Agent, or Firm—Schulte Roth & Zabel; Joel E. Lutzker; John C. Garces

(57) ABSTRACT

Disclosed is an improved video recorder housing having a main-and-auxiliary pivoting gate assembly to open and close its front cassette slot. The housing has a chamfered cassette guide extending inward from the lower edge of the cassette slot. The housing has a horizontal pin positioned inside and above the cassette slot. The main gate is attached to rotate about the horizontal pin and is spring-biased toward its closing position. The main gate has a sub-horizontal pin and an inverted "L"-shaped lever both operatively connected to control the degree of opening of the auxiliary gate. The auxiliary gate is spring-biased toward its closing position, and can be rotated about the sub-horizontal pin while the inverted "L"-shaped lever rolls on the ceiling of the housing. With this arrangement, the main gate is kept half open with its lower edge caught by the upper surface of a videocassette loaded inside the video recorder. The auxiliary gate then suspends vertically in the cassette slot leaving a lateral space between the lower edge of the auxiliary gate and the chamfered cassette guide permitting the label of the videocassette to be seen from the outside.

5 Claims, 6 Drawing Sheets

VIDEO RECORDER HOUSING HAVING MAIN-AND-AUXILIARY PIVOTING GATE ASSEMBLY

BACKGROUND OF THE INVENTION

1. Field of the Invention

The present invention relates to a video recorder housing having a pivoting gate permitting the backbone or rear side of a videocassette fitted in the housing to be seen from the outside.

2. Related Prior Art

Referring to FIG. 8, a conventional video recorder housing 1 has a cassette slot 2 made on its front side for inserting and removing a videocassette 3 from the housing 1. The housing 1 has a pivoting gate to close and open the cassette slot 2. When a videocassette is loaded into the housing, the cassette is applied to the gate to push the gate open inwards. The videocassette is then pushed forward onto the cassette guide to be lowered and set on the reel stage.

FIG. 9 shows how the videocassette 3 is located inside the housing. In the loading position, the videocassette 3 is laid on the reel stage behind the cassette guide 4. The cassette guide is flush with the lower edge of the cassette slot 2, thus putting the rear label 5 of the videocassette out of sight from the outside. In this position, the rear label 5 of the videocassette 3 cannot be seen even if the gate 6 is opened fully. The label 5 of the videocassette 3 cannot be seen without taking the videocassette 3 out of the housing 1. Alternatively, the videotape may be played back to see the title of the recorded television show or picture. In any event, it cannot be confirmed immediately what videotape is loaded once it has been put into the housing 1.

To reduce the above described inconvenience, the cassette guide 4 is notched to provide a chamfered edge 7, shown in FIG. 9, thereby permitting viewers to see the label 5 of the tape cassette 3 from the outside. Alternatively, a transparent gate may be used to see inside. Use of the transparent gate, however, causes some adverse effects on the function of the videotape recorder because of invasion of the surrounding light inside. Additionally, no indications describing, for instance, a particular type of the machine can be put on the transparent gate 6.

Japan Patent 9-274790(A) shows a video recorder housing using a transparent gate and an information-bearing gate, both pivoted on the upper edge of the cassette slot front and rear. These, front, transparent and rear letters-printed gates are so operatively connected that a videocassette when loaded inside may be visible through the transparent gate, while the letters-printed gate is pushed up and laid on the upper surface of the videocassette in the housing. In this position the information on the rear gate cannot be seen from the outside. Conversely when no videotape cassette is loaded inside, the rear gate is behind the front transparent gate so that the information on the rear gate may be seen through the front transparent gate.

Disadvantages of such double gate structure and associated actuator mechanism include a significant increase in the manufacturing cost of the video recorder.

SUMMARY OF THE INVENTION

Accordingly, it is an object of the present invention to provide a video recorder housing having a main-and-auxiliary pivoting gate assembly which can attain a dual-purpose of permitting the backbone or rear side of a videocassette fitted inside to be seen from the outside and presenting some other information on the gate to the outside, without adding a substantial amount to the manufacturing cost of the video recorder housing.

To attain this object, a video recorder housing having a main-and-auxiliary pivoting gate assembly to open and close the cassette slot for inserting and removing a videocassette from the video recorder, is improved according to the present invention. Specifically, the housing of the present invention has a horizontal pin fixed inside and above the cassette slot, the main gate is mounted to rotate about the provided horizontal pin and is spring-biased toward its closing position. The main gate has a sub-horizontal pin and an inverted "L"-shaped lever both operatively connected to control the opening degree of the auxiliary gate. The auxiliary gate is spring-biased toward its closing position, and can be rotated about the sub-horizontal pin, while the inverted "L"-shaped lever rolls on the ceiling of the housing.

The main gate has a depression made on its front side, the depression being so sized and shaped that the auxiliary gate may be snuggly fitted in the depression to be coplanar with the front side of the main gate.

The auxiliary gate preferably bears some pieces of information, such as a trademark or a brand name on its front side.

The main gate is pivoted to the inside of the housing above the cassette slot, and the auxiliary gate bearing the brand name information on its front side is pivoted to the main gate. The main and auxiliary gates are spring-biased toward their closing positions. In operation, a videocassette is pushed into the cassette slot of the video recorder, while forcing the main-and-auxiliary gate assembly to yieldingly rotate inward of the housing. When the videocassette is loaded into the housing, it is laid on the reel stage at a level lower than the level of the cassette slot. During this loading, the lower edge of the main gate is caught by the upper surface of the videocassette to be inclined with respect to the cassette slot while the auxiliary gate suspends substantially vertically behind the cassette slot. In this position, between the lower edge of the suspending auxiliary gate and the chamfered cassette guide extending inward from the lower edge of the cassette slot, there remains a lateral space wide enough to allow an outside observer to see the label of the videocassette fitted inside.

The above and other objects, aspects, features and advantages of the invention will be more readily apparent from the description of the preferred embodiment thereof taken in conjunction with the accompanying drawings and appended claims.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION OF THE PREFERRED EMBODIMENT AND THE DRAWINGS

Figure 1:
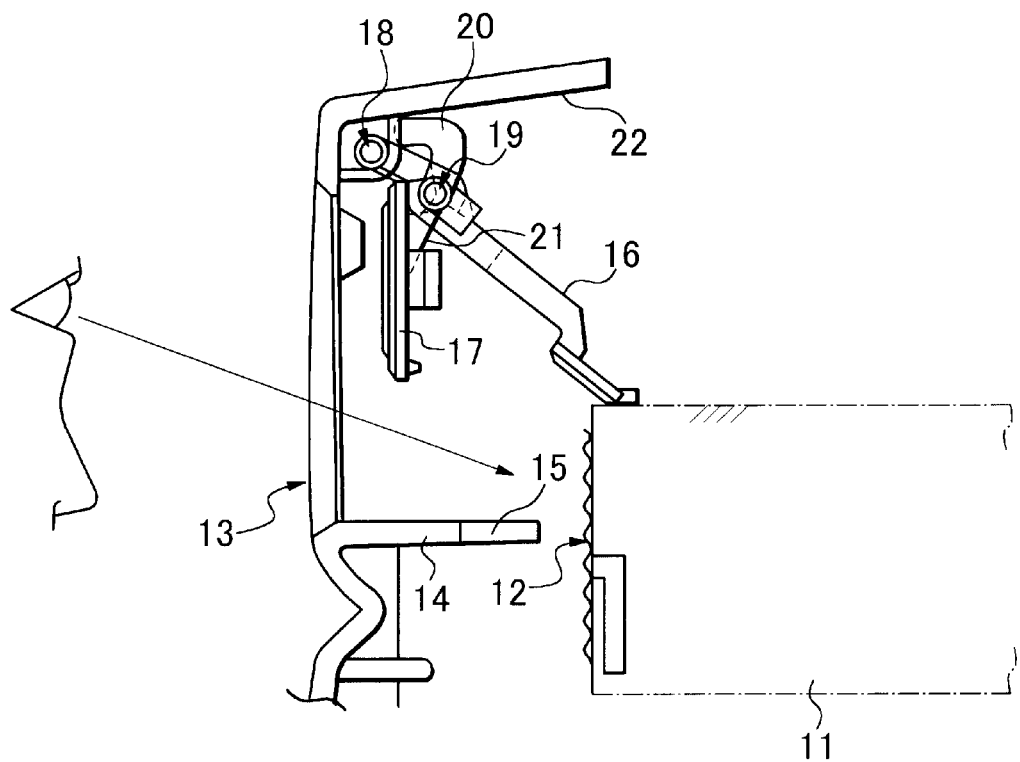
FIG. 1 illustrates a video recorder housing equipped with a main-and -auxiliary gate assembly according to one embodiment of the present invention, wherein the video recorder housing is loaded with a videocassette.

Referring to FIG. 1, a video recorder housing has a main-and-auxiliary pivoting gate assembly including a main gate 16 and an auxiliary gate 17 to open and close a cassette slot 13, which permits a videocassette 11 to be inserted and removed from the housing. The housing has a horizontal pin 18 fixed inside and above the cassette slot 13. The main gate 16 is mounted for rotation about the horizontal pin 18 and is spring-biased toward its closing position. The main gate has a sub-horizontal pin 19 and an inverted "L"-shaped lever 20 both operatively connected to control degree of opening of the auxiliary gate 17. The auxiliary gate 17 is spring-biased toward its closing position and can be rotated about the sub-horizontal pin 19, while the inverted "L"-shaped lever rolls on a ceiling 22 of the video recorder housing.

The videocassette 11 has a label 12 applied to its rear side. The housing has a cassette guide 14 extending inward from the lower edge of the cassette slot 13. The cassette guide is chamfered to form a slant 15 on its rear side.

Figure 2:
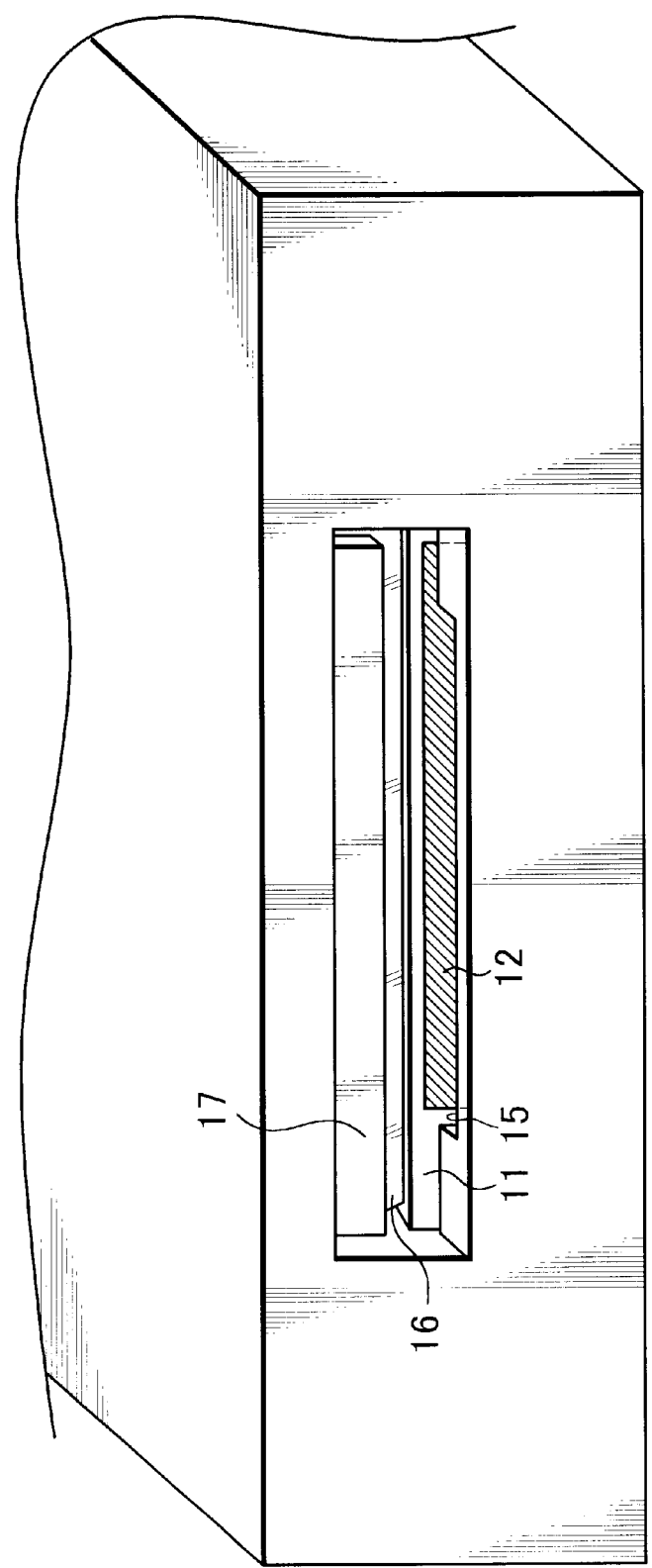
FIG. 2 is a perspective view of the video recorder housing of FIG. 1 as viewed from its front side.
Figure 3:
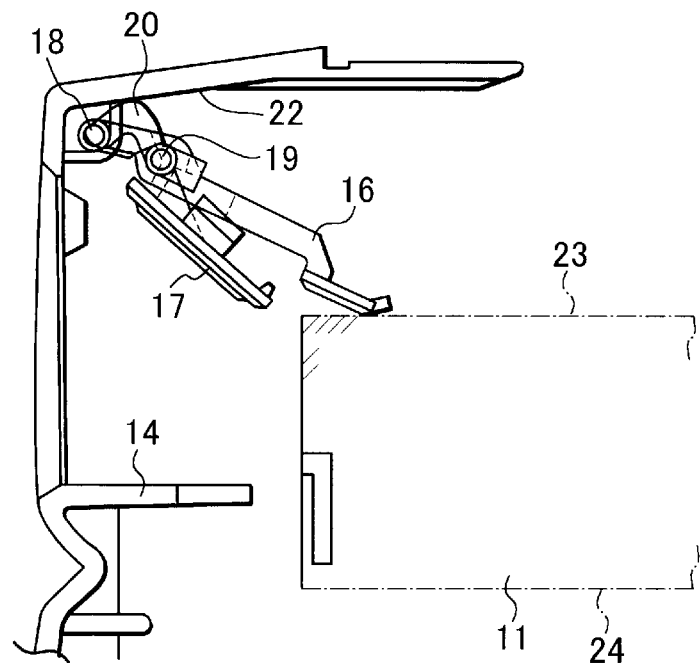
FIG. 3 illustrates the housing with the videocassette raised up on the way to the ejecting position.

Referring to FIG. 2, the rear side or backbone of the videocassette 11 is exposed through the lateral space, which is defined between the lower edge of the main-and-auxiliary gate assembly and the chamfered edge 15 of the cassette guide 14 to permit the label 12 of the videocassette 11 to be seen from the outside. As shown in FIG. 3, the lower edge of the main gate is engaged by the upper surface 23 of the videocassette 11 keeping the main gate 16 partially open. Likewise, the auxiliary gate 17 is kept partially open by the inverted "L"-shaped lever 20, as described in detail later.

As described above, the main gate 16 is pivoted to the inside of the housing to rotate about a horizontal pin 18, which is positioned above the cassette slot. Additionally, the main gate is spring-biased toward its closing position by a coiled spring 28, which is attached to the horizontal pin 18. Likewise, the auxiliary gate 17 is pivoted to the front side of the main gate 16 to rotate about a sub-horizontal pin 19, which is positioned across the main gate 16. The inverted "L"-shaped lever 20 is connected at one of its two ends to the auxiliary gate 17 via the sub-horizontal pin 19. The auxiliary gate 17 is spring-biased toward its closing position by a coiled spring 21, which is also attached to the sub-horizontal pin 19. With this arrangement, the auxiliary gate 17 is independent of the main gate 16 in its opening-and-closing operation.

The inverted "L"-shaped lever 20 rises from the sub-horizontal pin 19 so that it may be brought in contact with the ceiling 22 of the housing, thereby controlling the degree of opening-and-closing of the auxiliary gate 17. Referring to FIG. 3, the videocassette 11 is slightly raised from the loading position toward the ejecting position. Generally, the ejecting mechanism gradually raises the videocassette 11 to the level where it is flush with the cassette slot 13. The ejecting mechanism is well known per se, and no further description is necessary in understanding the present invention. As the videocassette 11 is raised, the lower edge of the main gate 16 is raised accordingly allowing the main gate 16 to rotate counterclockwise about the horizontal pin 18.

The counterclockwise rotation of the main gate 16 causes the sub-horizontal pin 19 of the auxiliary gate 17 to rise still higher, and the distance between the sub-horizontal pin 19 and the ceiling 22 is reduced accordingly. The inverted "L"-shaped lever 20, therefore, turns counterclockwise about the sub-horizontal pin 19, thereby forcing the auxiliary gate 17, operatively connected to the inverted "L"-shaped lever 20, to also turn counterclockwise about the sub-horizontal pin 19. This counterclockwise rotation of the auxiliary gate 17 brings it closer to the main gate 16.

Figure 4:
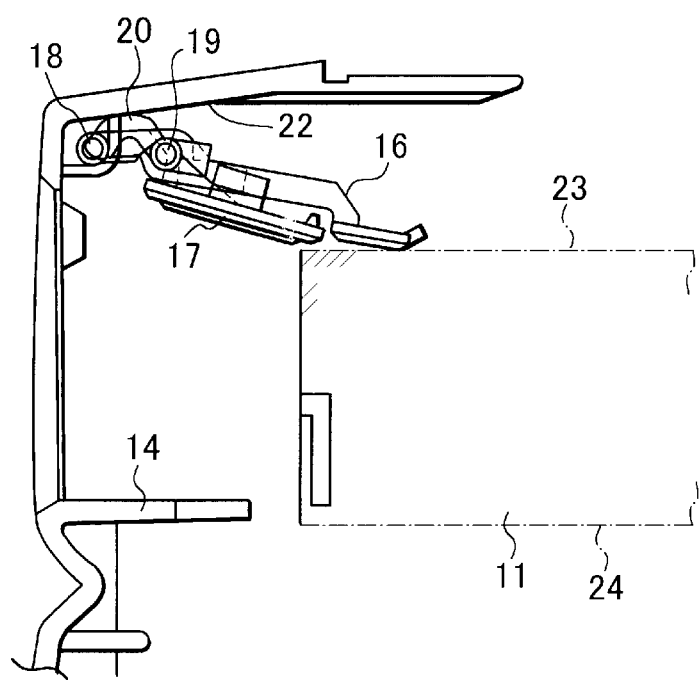
FIG. 4 illustrates the housing with the videocassette showing how the auxiliary gate moves in response to the videocassette being raised still higher.

As shown in FIG. 4, the videocassette 11 may be raised so high that the lower surface 24 of the videocassette 11 is close to the cassette guide, which extends inward from the lower edge of the cassette slot 13. As a result, the lower edge of the main gate 16 is raised still higher, while the main gate 16 continues to rotate counterclockwise about the horizontal pin 18. At the same time, the auxiliary gate 17 rotates about the sub-horizontal pin 19 in the same counterclockwise direction. The resilient force applied to the auxiliary gate 17 to effectuate its closing is suppressed as the inverted "L"-shaped lever 20 rolls on the ceiling 22 preventing the auxiliary gate 17 from closing. However, the same rolling movement of the lever 20 permits the gate 17 to open wider.

Figure 5:
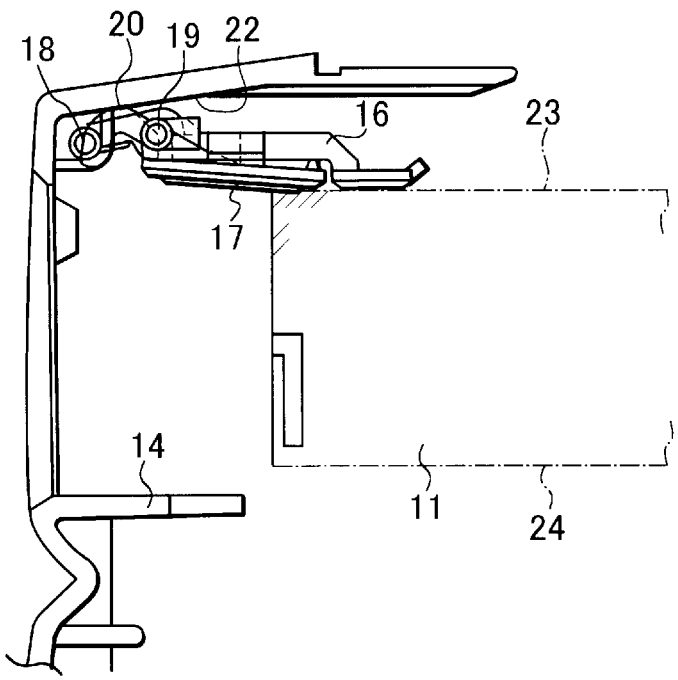
FIG. 5 illustrates the housing with the videocassette showing that the videocassette is raised to be flush with the cassette slot.

As shown in FIG. 5, when the videocassette 11 is raised up to the highest level at which the lower surface 24 of the videocassette 11 is above the cassette guide 14, the videocassette can be ejected from the cassette slot 13 if it is pushed forward. In this position the main gate 16 is laid flat on the upper surface 23 of the videocassette 11. The sub-horizontal pin 19 about which the auxiliary gate 17 rotates is raised with the main gate 16, thereby reducing the distance between the sub-horizontal pin 19 and the ceiling 22 and making the inverted "L"-shaped lever 20 rotate further counterclockwise. At the same time, the auxiliary gate 17 rotates about the sub-horizontal pin 19 until the auxiliary gate is laid on the front of the main gate 16.

In the preferred embodiment, the main gate 16 has a depression formed on its front side. The depression is sized and shaped to allow the auxiliary gate 17 to be snugly fitted within the boundaries of this front depression of the main gate 16. Thus, the auxiliary gate 17 is substantially flush with the main gate 16.

Figure 6:
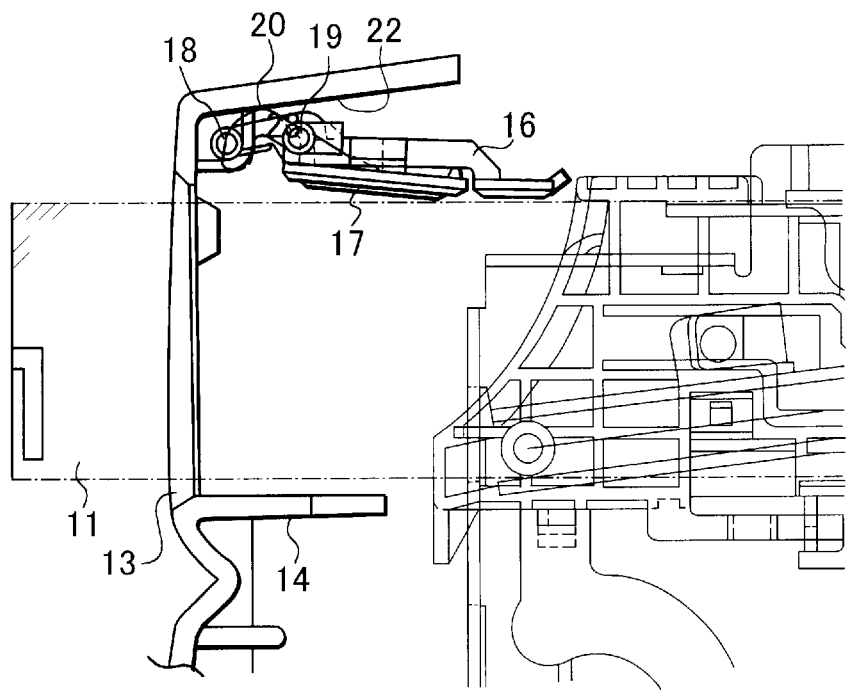
FIG. 6 illustrates the housing with the videocassette protruding partly from the cassette slot.

Referring to FIG. 6, the videocassette 11 may be pushed forward from the position of FIG. 5, allowing the main-and-auxiliary gate assembly to slide along the upper surface 23 of the videocassette 11. The videocassette 11 then proceeds through the cassette slot 13 and stops when it appears partly from the slot.

Figure 7:
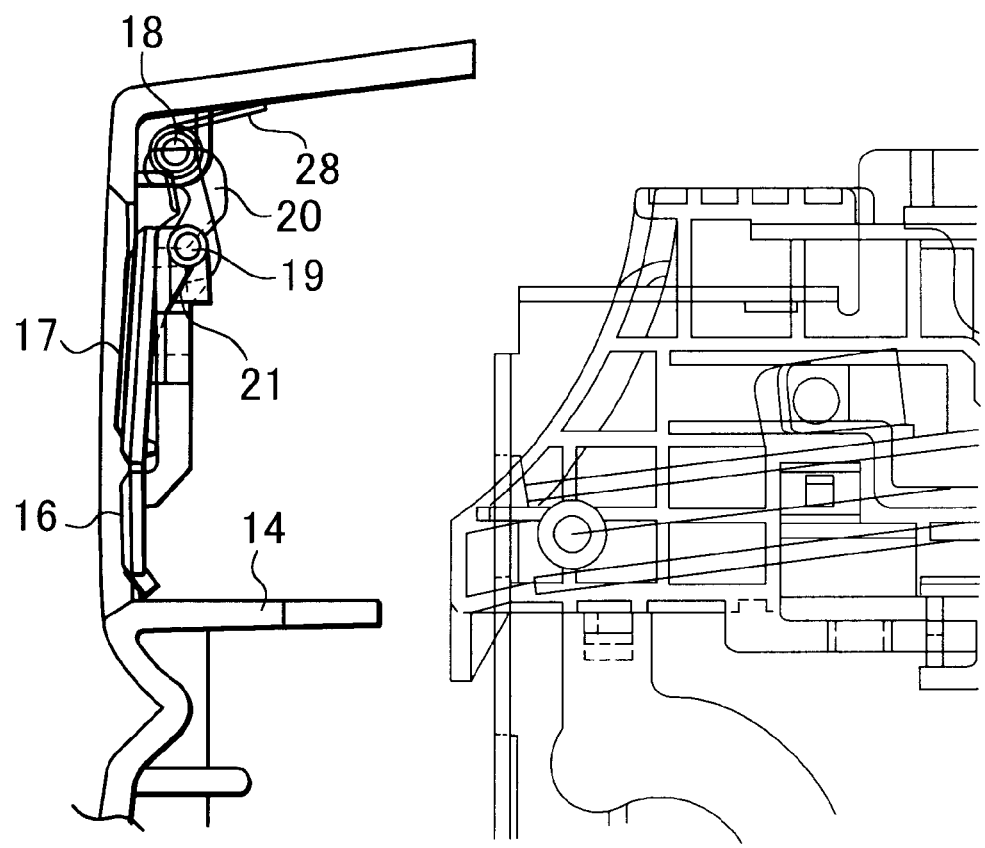
FIG. 7 illustrates the housing when the videocassette is removed therefrom.
Figure 8:
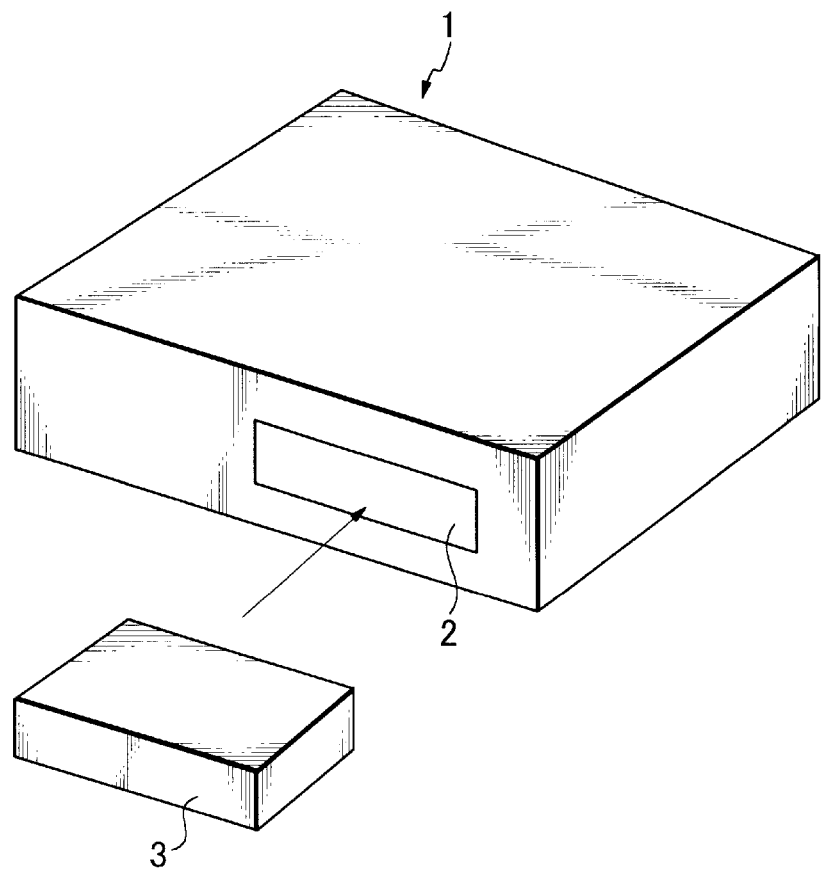
FIG. 8 is a perspective view of a video recorder.
Figure 9:
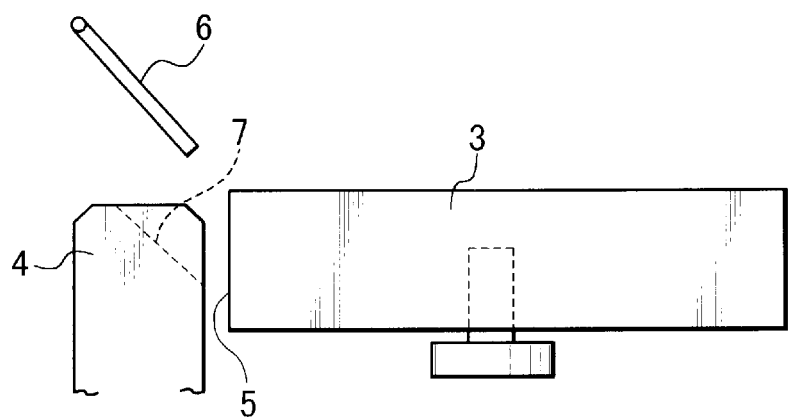
FIG. 9 is a conventional housing structure.

Referring to FIG. 7, the videocassette 11 is removed from the housing, allowing the coiled spring 28 attached to the main gate 16 to bring the main gate to its closing position thereby closing the cassette slot 13. In this position the auxiliary gate 17 is fitted within the front depression of the main gate 16.

The main gate 16 is kept closed under the influence of the coiled spring 28, which is attached to the horizontal pin 18. Likewise, the auxiliary gate 17 is kept closed under the influence of the coiled spring 21, which is attached to the sub-horizontal pin 19. The main gate 16 and the auxiliary gate 17 is each equipped with a stopper to prevent either gate from protruding beyond their vertical position, as shown in the drawings. In the preferred embodiment, the resilient force of the coiled spring 28 attached to the horizontal pin 18 for the main gate 16 is stronger than that of the coiled spring 21 attached to the semi-horizontal pin 19 for the auxiliary gate 17.

The auxiliary gate 17 need not be transparent. The space defined by the lower edge of the auxiliary gate in the cassette slot and the chamfered cassette guide permits the label of the backbone of the videocassette fitted inside the housing to be seen from the outside. Therefore, the auxiliary gate can have a trade name or any other information printed thereon. The auxiliary gate can be rotatably fixed to a horizontal pin positioned above the upper edge of the cassette slot. When a videocassette is loaded into the housing, the auxiliary gate of the present invention can effectively prevent injection of surrounding light into the interior of the housing.

Although the invention has been described with reference to the preferred embodiments, it will be apparent to one skilled in the art that variations and modifications are contemplated within the spirit and scope of the invention. The drawings and description of the preferred embodiments are made by way of example rather than to limit the scope of the invention, and it is intended to cover within the spirit and scope of the invention all such changes and modifications.

What is claimed is:

1. A video recorder housing having a main-and-auxiliary pivoting gate assembly to open and close a cassette slot for inserting and removing a videocassette from a video recorder, said assembly comprising a main gate and an auxiliary gate; wherein said housing has horizontal pins and above said cassette slot; wherein said main gate is mounted for rotation about said horizontal pins, said main gate being spring-biased toward its closing position; wherein said main gate has a sub-horizontal pin located apart from said horizontal pin; and wherein said sub-horizontal pin and an inverted L-shaped lever are both operatively connected to control the degree of opening of said auxiliary gate, said auxiliary gate being spring-biased toward its closing position, and being rotatable about said sub-horizontal pin while said inverted L-shaped lever rolls on a ceiling of said housing.

2. A video recorder housing according to 1, wherein said main gate has an indentation formed on its front side, the indentation being sized and shaped so as to snuggly fit said auxiliary gate therein to be coplanar with said front side of said main gate.

3. A video recorder housing according to 1, wherein said auxiliary gate bears information applied to its front side.

4. A video recorder housing having a main-and-auxiliary pivoting gate assembly to open and close a cassette slot for inserting and removing a videocassette from a video recorder, said assembly comprising a main gate and an auxiliary gate; wherein said housing has horizontal pins inside and above said cassette slot; wherein said main gate is mounted for rotation about said horizontal pins said main gate being spring-biased toward its closing position; wherein said main gate comprises a sub-horizontal pin and an inverted L-shaped lever both operatively connected to control the degree of opening of said auxiliary gate, said auxiliary gate being spring-biased toward its closing position, and being rotatable about said sub-horizontal pin while said inverted L-shaped lever rolls on a ceiling of said housing; and wherein said main gate has an indentation formed on its front side, the indentation being sized and shaped so as to snuggly fit said auxiliary gate therein to be coplanar with said front side of said main gate.

5. A video recorder housing according to claim 4, wherein said auxiliary gate bears information applied to its front side.

* * * * *